United States Patent [19]

Allebach et al.

[11] Patent Number: 4,949,389
[45] Date of Patent: Aug. 14, 1990

[54] OPTICAL RANKED-ORDER FILTERING USING THRESHOLD DECOMPOSITION

[75] Inventors: Jan P. Allebach, West Lafayette, Ind.; Ellen Ochoa, Pleasanton; Donald W. Sweeney, Alamo, both of Calif.

[73] Assignee: The United States of America as represented by the United States Department of Energy, Washington, D.C.

[21] Appl. No.: 106,295

[22] Filed: Oct. 9, 1987

[51] Int. Cl.⁵ .............................................. G06K 9/76
[52] U.S. Cl. ...................................... 382/31; 382/42; 350/162.12; 350/162.13
[58] Field of Search .................... 382/31, 42, 43, 54; 350/162.12, 162.13

[56] References Cited

U.S. PATENT DOCUMENTS

| | | | |
|---|---|---|---|
| 4,442,544 | 4/1984 | Moreland et al. | 382/53 |
| 4,462,046 | 7/1984 | Spight | 382/42 |
| 4,468,704 | 8/1984 | Stoffel et al. | 358/282 |
| 4,695,973 | 9/1987 | Yu | 350/162.13 |
| 4,765,714 | 8/1988 | Horner et al. | 350/162.13 |
| 4,826,285 | 5/1989 | Horner | 382/42 |
| 4,832,447 | 5/1989 | Javidi | 350/162.13 |

OTHER PUBLICATIONS

J. P. Fitch, E. J. Coyle, and N. C. Gallagher, Jr., "Median Filtering by Threshold Decomposition", IEEE Trans. on Acoustics, Speech, and Signal Proc. vol. AS-SP-32, No. 6, pp. 1183-1188, 1984.

A. D. Fisher, "A Review of Spatial Light, Modulators", Proceedings of the OSA Topical Meeting on Optical Computing, Incline Village, NV 1985.

K. S. O'Neill and W. T. Rhodes, "Morphological Transformations by Hybrid Optical-Electronic Methods", Proc. SPIE, vol. 638, 1986.

Primary Examiner—David K. Moore
Assistant Examiner—Jose L. Couso
Attorney, Agent, or Firm—Karla Ojanen; James H. Chafin; William R. Moser

[57] ABSTRACT

A hybrid optical/electronic system performs median filtering and related ranked-order operations using threshold decomposition to encode the image. Threshold decomposition transforms the nonlinear neighborhood ranking operation into a linear space-invariant filtering step followed by a point-to-point threshold comparison step. Spatial multiplexing allows parallel processing of all the threshold components as well as recombination by a second linear, space-invariant filtering step. An incoherent optical correlation system performs the linear filtering, using a magneto-optic spatial light modulator as the input device and a computer-generated hologram in the filter plane. Thresholding is done electronically. By adjusting the value of the threshold, the same architecture is used to perform median, minimum, and maximum filtering of images. A totally optical system is also disclosed.

12 Claims, 2 Drawing Sheets

OPTICAL RANKED-ORDER FILTERING USING THRESHOLD DECOMPOSITION

BACKGROUND OF THE INVENTION

Median filters are widely used in image processing because they remove impulsive noise while preserving edges and locally monotonic regions. Median filters are one example of a class of filters known as order statistic filter that require a ranking of pixels within the filter window. When only one of the ordered pixels (the ith pixel) is selected as the output of the filter, the result is called an ith ranked-order operation. The median filter of window size N is therefore an (N+1)/2 ranked-order operation. Maximum and minimum filters are respectively Nth and 1st ranked-order operations. Such filters have been applied to texture and feature analysis as well as noise reduction. When utilized on binary images, a minimum filter results in an operation known as erosion, and a maximum filter results in dilation. Successive applications of erosion and dilation result in morphological transformations that are useful for image segmentation.

Ranked-order filters begin with a ranking of the pixels within the filter window. Various algorithms have been presented for performing this nonlinear neighborhood operation. Threshold decomposition (as explained by J. P. Fitch, E. J. Coyle, and N. C. Gallagher, Jr., "Median Filtering by Threshold Decomposition," *IEEE Trans. on Acoustics, Speech, and Signal Proc.* ASSP-32, 1183 (1984)) is an approach that transforms the ranking operation to a linear space-invariant filtering step followed by a nonlinear point-to-point threshold comparison step. Threshold decomposition separates a (K+1)-level quantized input image into K binary threshold images. (For example, 16 binary images will encode a 17-level image; for notational convenience, this is referred to as a K-level decomposition.) This kth threshold image is 1 where the input image exceeds the kth input threshold of the equalizer and 0 elsewhere. Ranked-order filtering of the binary threshold images can be realized with a moving average followed by a global threshold comparison step. Superposition of the K ranked-order filtered threshold images yields the filtered output image.

An analog optical electronic system which performs ranked-order operation of binary images only has been disclosed in the following: K. S. O'Neill and W. T. Rhodes, "Morphological Transformations by Hybrid Optical-Electronic Methods," *Proc. SPIE* 638, 1986. Implementation of this system is based on an incoherent imaging system whose point spread or blurring function is the desired filter function.

Electronic means of determining threshold levels across an image for use in converting the analog pixel signals into digital pixels have been disclosed in U.S. Pat. No. 4,442,544 (Moreland et al) and U.S. Pat. No. 4,468,704 (Stoffel et al). These pixel values are then either stored or sent to a device such as a printer.

SUMMARY OF THE INVENTION

In accordance with the present invention, a method and apparatus are provided for performing two-dimensional ranked-order filtering of an image. Initially, the image is electronically screened and binary threshold images of the screened image are generated. These binary threshold images are then written on a first spatial light modulator. The binary threshold images from the first light modulator are projected to a filtering means for ranked-order filtering of these images to form multiplexed threshold images. A composite image of the filtered multiplexed threshold images is then electronically screened with a constant threshold. The screen composite image is next written onto a second spatial light modulator. The screened composite images are then projected from the second spatial light modulator to a filtering means for filtering by superposition. Finally, the superposition filtered composite image is suitably imaged.

In the preferred embodiment of the present invention, the first and second spatial light modulators are a unitary spatial light modulator on which both the generated binary threshold images and the screened composite image are written. This unitary spatial light modulator has a filter plane in which both the binary threshold images and the screened composite images are projected. A computer generated hologram is also preferably encoded with a Fourier transform of a ranked-order filter window for filtering the binary threshold images as well as a Fourier transform of a superposition filter window for filtering the screened composite image. The two Fourier transform holograms are superimposed but coded at different spatial frequencies so that the resulting outputs are imaged at different portions of the image plane.

Preferably, the projecting means is a unitary device including a laser beam and a rotating diffuser through which the laser beam is passed.

The present invention is also capable of median filtering, minimum filtering, and maximum filtering. The type of filtering desired is determined by calibrating the constant threshold by which the composite image is electronically screened.

A totally optical system for performing ranked-order filtering is also provided.

It is a feature of the present invention that a threshold decomposition is used as an encoding scheme in an incoherent optical correlation system.

It is also a feature of the present invention that spatial multiplexing of binary threshold images is accomplished so that all of the images can be optically filtered simultaneously.

It is a further feature of the present invention that an e-beam computer-generated hologram is used in an incoherent optical correlation system in order to perform ranked-order filtering.

A further feature of the present invention is the use of a two-phase process to perform ranked-order filtering. In the first phase, the binary threshold components are generated electronically and optically filtered. In the second phase, the filtered values are thresholded electronically and optically recombined to obtain the final filtered image values. Both optical steps use the same apparatus and the filters for both steps are superimposed on a single hologram.

Still another feature of the present invention is the provision of a self-calibration for the system in which the thresholds to be used during the optical steps can be learned. This allows the system to be tolerant of spatial variations in camera sensitivity, hologram diffraction efficiency and other system parameters.

Other features and objects of the present invention are stated in or apparent from a detailed description of presently preferred embodiments of the invention found hereinbelow.

BRIEF DESCRIPTION OF THE DRAWINGS

FIGS. 2a and 2b are schematic representations of a ranked-order filtering of threshold components and a superposition of threshold components, respectively.

DETAILED DESCRIPTION OF THE PREFERRED EMBODIMENTS

Figure 1:
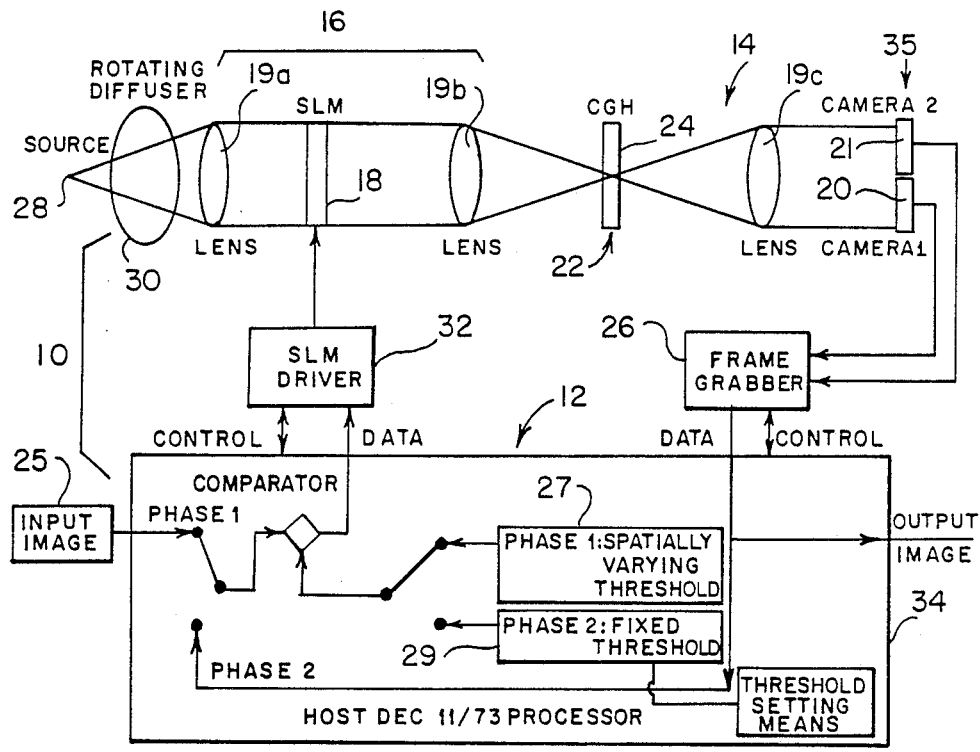
FIG. 1 is a schematic representation of the hybrid optical/electronic system of the present invention.

Disclosed herein is a hybrid optical/electronic apparatus 10 of ranked-order filters based on a spatially multiplexed threshold decomposition. Filtering and superposition of the K threshold images are well-suited to optical implementation because of the parallelism inherent to optical processors and the ease with which linear, space-invariant filtering can be performed optically. The point-to-point thresholding operations are implemented by a thresholding system 12 while an optical system 14 is used for filtering and superposition. Because of the limited resolution of available spatial light modulators (SLM's), this approach is not presently competitive with a fully electronic implementation. However, it should be appreciated that this situation may be expected to change with continuing advances in SLM development to make the present invention advantageous.

The optical system 14 consists of an incoherent correlation system 16 including a Litton iron-garnet spatial light modulator 18 and associated lenses 19a and 19b which provide an input, and cameras 20 and 21 and associated lens 19c to detect an output. A filter plane 22 of incoherent correlation system 16 contains a computer-generated hologram 24 written with an e-beam lithographic system. The hologram includes the Fourier transform of both a ranked-order filter window and a superposition filter window.

Ranked-order filtering is done in two phases. During the first phase, binary threshold images are generated in thresholding system 12 by electronically screening an input image 25 of the original image with a spatially-varying threshold means 27 and writing the result on the light modulator 18. At an appropriate position in the output plane 35, multiplexed threshold images which are individually filtered by a moving average are obtained and are thus imaged by camera 20. During the second phase, the composite image of multiplexed threshold images is electronically screened in thresholding system 12 with a constant or fixed threshold means 29 and written back onto the light modulator 18. A different position in the output plane 35 then contains the final ranked-order filtered image which is imaged by camera 21. As explained subsequently, this technique of spatially multiplexed threshold decomposition allows minimum, maximum, and median filtering to be implemented with hybrid system 10. Only the value of the constant threshold means 29 then needs to be changed to obtain a particular operation. Therefore, optical system 14 is capable of performing any ith ranked-order operation or cascade of such operations. In fact, using a cascade of maximum and minimum filtering operations, optical system 14 can implement an even broader category of nonlinear filters known as stack filters (as discussed subsequently).

As will be appreciated by those of ordinary skill in the art, threshold decomposition is a method of encoding signals or images in a binary form that allows complicated ranking operations to be replaced by mostly addition operations. The binary images are derived as the decomposition of the K-level quantized input image into its K component threshold images. The kth threshold image is 1 where the input image exceeds the kth quantizer input threshold and 0 elsewhere. The basic premise is that ranked-order filtering of a multi-level image is equivalent to decomposing the image into binary images, filtering each binary image, and then reversing the process.

The filtering of each binary threshold image is simply an addition of the 1's within the filter window, followed by a threshold comparison step. The value of the threshold depends on the desired ranked-order operation. The filtering can therefore be implemented as a convolution of the filter window with each binary threshold image.

The entire process can be broken down into four steps. With the present invention two are implemented optically with optical system 14 and two are performed electronically with thresholding system 12. In the mathematical description of these steps, the input image is denoted as $x(i,j)$, which is of size $L \times W$ pixels. Each pixel is quantized into one of K levels. The size of the filter window is $$2N_T + 1 = (2N_x + 1) \times (2N_y + 1).$$

Each of the following steps must be performed for all pixels $i=0, \ldots, L-1$ and $j=0, \ldots, W-1$. The first three steps must be done for all levels $k=0, \ldots, K-1$:

A. Generation of binary threshold components $$x_k(i,j) = \begin{cases} 1 & x(i,j) \geq k + \frac{1}{2} \\ 0 & \text{else.} \end{cases} \quad (1)$$

B. Addition of 1's within the filter window $$z_k(i,j) = \sum_{n_x=-N_x}^{N_x} \sum_{n_y=-N_y}^{N_y} x_k(i + n_x, j + n_y) \\ = \sum_{l=0}^{L-1} \sum_{w=0}^{W-1} h_R(i - l, j - w) x_k(l,w), \quad (2)$$

where the mask for the ranked-order filtering operation is $$h_R(l,w) = \begin{cases} 1 & |l| \leq N_x, |w| \leq N_y \\ 0 & \text{else.} \end{cases} \quad (3)$$

C. Threshold comparison $$y_k(i,j) = \begin{cases} 1 & z_k(i,j) \geq N_T + \frac{1}{2} \\ 0 & \text{else.} \end{cases} \quad (4)$$

This threshold value results in a median filter. For minimum filtering, the condition to produce a 1 is $$z_k(i,j) \geq (2N_T+1) - \frac{1}{2}, \quad (5)$$

and for maximum filtering, the condition is $$z_k(i,j) \geq \tfrac{1}{2}. \tag{6}$$

D. Superposition of filtered threshold components $$y(i,j) = \sum_{k=0}^{K-1} y_k(i,j). \tag{7}$$

To take full advantage of the parallelism available with optical processing, the threshold components $\bar{x}_k(i,j)$ are spatially multiplexed into a single image $\bar{x}(i,j)$. This allows the performance of steps A, B, and C simultaneously for all $k=0, \ldots, K-1$. The multiplexing procedure and the modification of Steps B, C, and D for operation on the spatially multiplexed images are as follows and are suitably used in developing a computer program.

A. Generation of spatially multiplexed binary threshold components $$\bar{x}(i,j) = \bar{x}\lfloor (i)_{K}xK_x + (j)_{K}y \rfloor ([i/K_x], [j/K_y]), \tag{A1}$$

where $(n)_m$ denotes the remainder after division of n by m, $\lfloor x \rfloor$ is the greatest integer $\leq x$, and $x_k(i,j)$ is the kth threshold image defined by Eq (1).

B. Addition of 1's within the filter window $$\bar{z}(i,j) = \sum_{l=0}^{\bar{L}-1} \sum_{w=0}^{\bar{W}-1} \bar{h}_R(i-1, j-w)\bar{x}(l,w), \tag{A2}$$

where $$\bar{h}_R(l,w) = \begin{cases} h_R(l/K_x, w/K_y) & (l)_{K_x}=0 \text{ and } (w)_{K_y}=0 \\ 0 & \text{else,} \end{cases} \tag{A3}$$

and $h_R(l,w)$ is given by Eq. (3).

C. Threshold $$\bar{y}(i,j) = \begin{cases} 1 & \bar{z}(i,j) \geq N_T + \tfrac{1}{2} \\ 0 & \text{else.} \end{cases} \tag{A4}$$

This is the condition for median filtering. Those for minimum and maximum filtering are analogous to Eqs. (5) and (6).

D. Superposition of filtered threshold components $$y(i,j) = \sum_{k_x=0}^{K_x-1} \sum_{k_y=0}^{K_y-1} \bar{y}(K_x i + k_x, K_y j + k_y) \tag{A5}$$

$$= \sum_{l=0}^{\bar{L}-1} \sum_{w=0}^{\bar{W}-1} \bar{h}_S(K_x i - 1, K_y j - w)\bar{y}(l,w), \tag{A6}$$

where $$\bar{h}_S(l,w) = \begin{cases} 1 & 0 \leq l \leq K_x - 1, 0 \leq w \leq K_y - 1 \\ 0 & \text{else,} \end{cases} \tag{A7}$$

is the mask for the superposition window.

Graphically, the above procedure is described as follows. The tilde (e.g. $\bar{x}$) denotes multiplexed versions of the images defined by Eqs. (1)–(7). Among the possible ways to multiplex the binary threshold components, the format illustrated in FIG. 2(a) was chosen. The coordinates in parenthesis refer to the pixel coordinate of the input image $\bar{x}(i,j)$. For the example shown, each $\bar{x}(i,j)$ is encoded in binary threshold form in a $4\times 4$ cell of pixels in the multiplexed image $\bar{x}(i,j)$. The subscript k on the individual pixel elements $x_k$ of $\bar{x}(i,j)$ denotes the particular threshold component defined by Eq. (1).

Figures 2A, 2B:
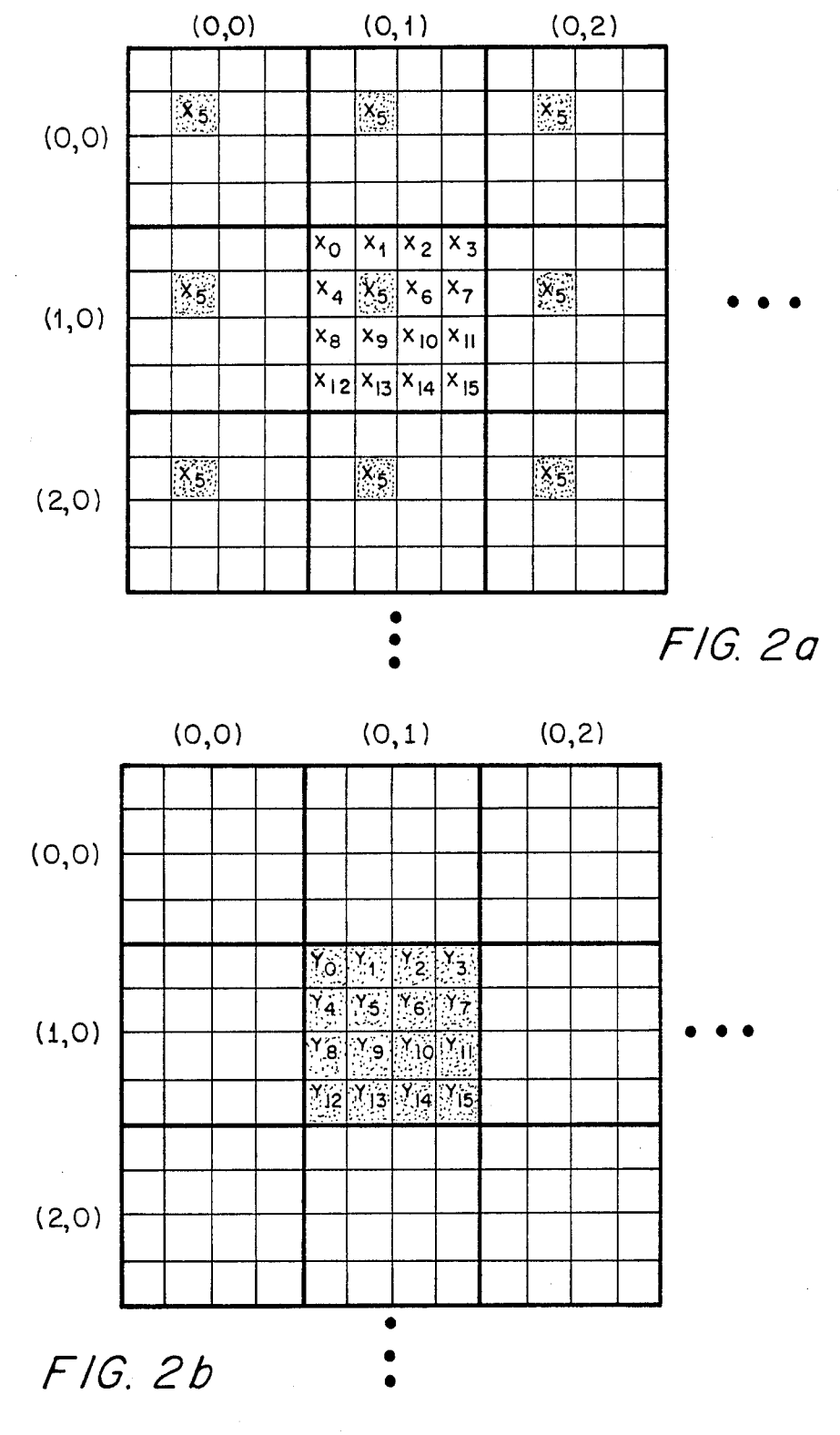

Step B, linear filtering of the multiplexed threshold components, is then accomplished by filtering with a modified mask $\bar{h}_R(1,w)$ such as that illustrated by the shaded elements in FIG. 2a for a $3\times 3$ ranked-order filter window. The filtered output $\bar{z}(i,j)$ at location $(i,j)=(5,5)$ would be computed by summing the values of these shaded elements. Step C is performed exactly as before with $\bar{z}(i,j)$ being thresholded according to Eq. (4) to produce the spatially multiplexed ranked-order filtered threshold components $\bar{y}(i,j)$.

As a consequence of the spatial multiplexing of the threshold components, the final step D may also be implemented as a linear, space-invariant filtering operation performed on $\bar{y}(i,j)$. The superposition filter mask $\bar{h}_S(1,w)$ is illustrated by the $4\times 4$ block of shaded pixels, shown in FIG. 2b. These pixels would be summed to generate the final ranked-order filtered output $y(1,1)$. Note that here we are only interested in the superposition window filtered output at every 4th pixel location in each dimension.

In hybrid optical/electronic system 10, ranked-order filtering of the input image is completed in two phases as mentioned above. During phase one, the spatially multiplexed threshold components are generated electronically and written on the spatial light modulator 18. Step B is performed optically with the SLM 18 as input. The filtered output is detected by a camera 20, digitized, and stored in a frame grabber 26. At this point, phase two commences. Step C is performed electronically; and the resulting binary, ranked-order filtered threshold components are written on the SLM 18 in the spatially multiplexed format. Step D is then performed optically, and the final ranked-order filtered image is detected by a second camera 21. It should be noted that all operations involving neighborhood processing are performed optically, and the only operation performed electronically is point-to-point thresholding.

Threshold decomposition produces a highly redundant representation of the original $L\times W$ image $x(i,j)$. Spatially multiplexing these threshold components to form $\bar{x}(i,j)$ is a resolution expanding operation. For a K-level image $x(i,j)$, each pixel is represented by a $K_x\times K_y$ block of pixels in the $\bar{L}\times \bar{W}$ multiplexed image $\bar{x}(i,j)$, where $K=K_xK_y$, $\bar{L}=K_xL$, and $\bar{W}=K_yW$. Thus, with an $M\times N$ element SLM, one can only filter images of size $M/K_x\times N/K_y$. To process larger images one must use sectioned filtering. With this technique, ranked-ordered filtering with a $J_x\times J_y$ window is accomplished by partitioning the output image $y(i,j)$ into $(M/K_x-J_x+1)\times(N/K_y-J_y+1)$ non-overlapping blocks of pixels. Each output block is computed by filtering an $M/K_x\times N/K$ block of pixels from the input image $x(i,j)$. Adjacent input blocks overlap by $J_x-1$ pixels in the vertical direction and $J_y-1$ pixels in the horizontal direction. Edge effects are handled by pixel replication. Because the upper left pixel of the window is replaced by the filter output, edge problems are postponed until the final $J_x-1$ rows and $J_y-1$ columns are to be filtered. An $L\times W$ output image is obtained by replicating the last row $J_x-1$ times the last column $J_y-1$ times. The total number of blocks that must be processed is $$N_B = \left\lceil \frac{LW}{(M/K_x - J_x + 1)(N/K_y - J_y + 1)} \right\rceil$$

where $\lceil x \rceil$ denotes the smallest integer $\geq x$.

With reference again to the hybrid optical/electronic apparatus 10 for performing ranked-order operations as shown in FIG. 1, it should be appreciated that the optical system 14 performs an incoherent correlation operation. An incoherent system 16 is thus employed, rather than a coherent system, for several reasons. Both the input and filter functions are binary, and the desired output at any given point is the number of 1's in the input which overlap the filter window. In a coherent system, the cameras 20, 21 would detect the square of this number, placing severe requirements on the dynamic range of the system. Incoherent systems also possess advantages with respect to signal-to-noise ratio and filter positioning requirements.

An experimental system was constructed by the inventors to evaluate the system 10. The incoherent light source 28 was produced by passing green Argon-ion laser light through a rotating diffuser 30. A 128×128 element Litton magneto-optic device was used as the binary spatial light modulator 18. The spacing of the elements was 76.2 micrometer and the maximum transmission of the device at 514.5 nm was approximately 2%. The pixel switching time was approximately 1 microsecond. Information was sent to the SLM 18 via a driver 32 from the host DEC 11/73 processor 34. Because several rows and columns of the Litton device did not function properly, the useful area of the device was restricted to a 48×48 patch. In addition, a 2×2 patch of magneto-optic elements was used to represent each binary threshold component, both to increase the light intensity at the output and to reduce the effect of switching errors. In each 48×48 patch written on the SLM 18, approximately 0.5% of the elements were in error.

The frequency-plane filter 24 contained both the 3×3 ranked-order filter and the 4×4 superposition filter. Before encoding, the Fourier transform amplitude was clipped at 0.5 of the maximum. This increased the diffraction efficiency of the hologram 24 while keeping the impulse response sufficiently uniform. The filter 24 was written at final size by an e-beam lithographic system. The computer-generated hologram (CGH) 24 was encoded using the projection technique described by N. C. Gallagher and J. A. Bucklew in "Nondetour Phase Digital Holograms: An Analysis," *Applied Optics* 19, 4266 (1980). The hologram contained 512×512 cells; and each cell contained four phase quantization subcells and 32 amplitude quantization levels. The phase and amplitude was computed at the center of each subcell. An e-beam data file was generated in standard MEBES format and written onto magnetic tape. The final hologram was generated by a local contractor using a Perkin-Elmer electron beam system. A e-beam address size of 0.31 micrometer and 8 address units per subcell was used. Standard mask processing resulted in a 5-millimeter square binary hologram recorded in chromium with an optical density of about 3.0. The quartz holographic substrate was flat to within 2 micrometers over the 5 cm square surface. A contact print of the CGH, bleached in bromine water, was used in the optical system 14 to increase diffraction efficiency.

The two convolution windows were positioned so that their respective outputs did not overlap. The result of the convolution of the 3×3 filter with the input was detected in the +1 order from the hologram 24 by camera 20. The other camera 21 was positioned to detect the 4×4 convolution result in the −1 order. The information contained in the +1 and −1 orders was the same for an incoherent system with a symmetric filter. Both cameras 20 and 21, one with a silicon target tube and one with a Chalnicon tube, were adjusted to operate in a linear regime to best utilize their dynamic range. The frame grabber 26 was a Datacube Video Acquisition and Display board that can accept several video inputs. Switching between cameras 20 and 21 after each phase was controlled by processor 34.

A typical run began with two calibration steps. The first calibration determined the fixed threshold. For median filtering with a total window size of 9, patterns were sent to the SLM 18 which resulted in the values "4" and "5" at camera 20. The threshold was set by a suitable threshold setting means 36 halfway between the two digitized values obtained from the camera 20. Similarly, for minimum filtering, the values "8" and "9" were used for calibration, and maximum filtering required the values "0" and "1". In the second calibration step, thresholds were determined for the levels "0" through "15" for camera 21 (assuming a 16 level image). Because of systematic errors across the output, it was necessary to determine a separate lookup table at each data point position. Once these calibration steps were performed, sectioned filtering began. A sample output from phase one showed patches superimposed on the output indicating the positions where data was acquired. All the pixels within one patch were averaged to determine one data point. The entire sequence of calibration, sectioning, and filtering operations was fully automated.

In the experiment, a first input image used in the filtering operations was a 48×48 pixel image of a seal, quantized to 4 bits. A second input image was obtained by adding uniform, random noise to an 8 bit version of the seal, and then quantizing the result to 4 bits.

Median filtering by a 3×3 window was performed both electronically and optically using the second image as the input. The results showed good agreement between the two methods. The few errors in the optical version were mainly due to switching errors on the SLM, which occurred in both phase one and phase two and which also affected the calibration steps. A second source of error was detector noise, especially for camera 20, which was less sensitive than camera 21. For a particular set of filtered binary threshold components from step C, the levels assigned to the final filtered image after step D were correct approximately 98% of the time, and were never more than one level off.

The first input was used as the input for both minimum and maximum filtering. The results of optical and electronic minimum filtering demonstrated a close correspondence between the optical and electronic results. The optical threshold for the maximum filtering was the most difficult to set. It was determined in the first calibration step as midway between the values of "0" and "1". Because of the low light levels, the value of "1" is almost in the noise; therefore, more errors were seen in this filtering operation than in the other two.

In conclusion, the experiment demonstrated that the hybrid optical/electronic apparatus 10 performed two-dimensional nonlinear ranked-order filtering operations. Using the technique of threshold decomposition, the nonlinear ranking operation became a linear, space-invariant filtering step followed by a threshold comparison step. The threshold components were spatially multiplexed so that they were all filtered simultaneously and then recombined by a second linear, space-invariant filtering operation. The incoherent optical system performed the linear filtering. The generation of threshold components and thresholding was done electronically. By adjusting the value of the constant threshold, the same architecture was used to perform median, minimum, and maximum filtering of images.

Because of the highly regular structure of the threshold decomposition approach, the present invention provides a parallel and modular design for a versatile VLSI implementation of ranked-order filters. Unfortunately, the disadvantage of either electronic or optical architectures based on threshold decomposition is the large resolution requirement. For a K-level image, the decomposition requires K bits per pixel, rather than log(K) bits. This highly redundant scheme sacrifices encoding efficiency for computational simplicity. In optical systems, the required number of addressable elements on the spatial light modular is increased. Since SLM's are presently the limiting technology, the inefficiency of threshold decomposition further restricts the processing speed.

For the important special case of 1 bit images, threshold and logarithmic encoding are identical. As mentioned earlier, ranked-order operations are often performed on binary images, to obtain erosion and dilation. The present invention can thus be used to compute these directly by placing the binary image in the input plane. Only one optical step is needed to determine the filtered image. These operations are easily cascadable as well.

While the scope of the present invention has been restricted to ith ranked-order filters, there exists a broader category of nonlinear filters, known as stack filters, which can be implemented using essentially the same optical architecture. Stack filters share the two properties of superposition (threshold decomposition) and stacking. The stacking property states that if the output signals from the stack of binary filters (used in the threshold decomposition architecture) are piled on top of each other according to their threshold level, the result is always a column of 1's with a column of 0's on top. The desired output is the level just before the transition from 1 to 0 occurs. It has been shown that the class of binary filters which satisfy this property are the positive Boolean operators; that is, Boolean expressions which contain no complements of the input variables. Stack filters are therefore constructed as stacks of positive Boolean functions. J. P. Fitch, "Software and VSLI Algorithms for Generalized Ranked Order Filtering", *UCRL*-92674, Mar. 1985, has shown that stack filters correspond to a generalization of the familiar ranked-order filters obtained by allowing the rank to be selected as a function of the filter position and the input signal values. In other words, stack filters can be interpreted as adaptive rank operators. Furthermore, it is possible to express any ranked-order filter as a combination of maximum and minimum operations. Since optical system 14 can perform maximum and minimum operations, it can be seen that a cascade of such operations, followed by the superposition step, results in an optical implementation of any stack filter.

As an example, consider an asymmetric median filter which eliminates only positive-going impulses. Such a filter might be used to process geological or biomedical signals in which large impulses of one sign are often significant features. In a 1-D, window width 3 version, the filter passes the value at the center of the input window unchanged, unless the values of each side of the center are both smaller than the center value. If so, the larger of the two side values is the filter output. The implementation of the filter requires two minimum operations, followed by a maximum operation. Note that the filter window may vary in size and shape for each of the operations, and therefore more than one ranked-order filter window might need to be recorded in the holographic filter in an optical system. The superposition filter remains unchanged.

Figure 3:
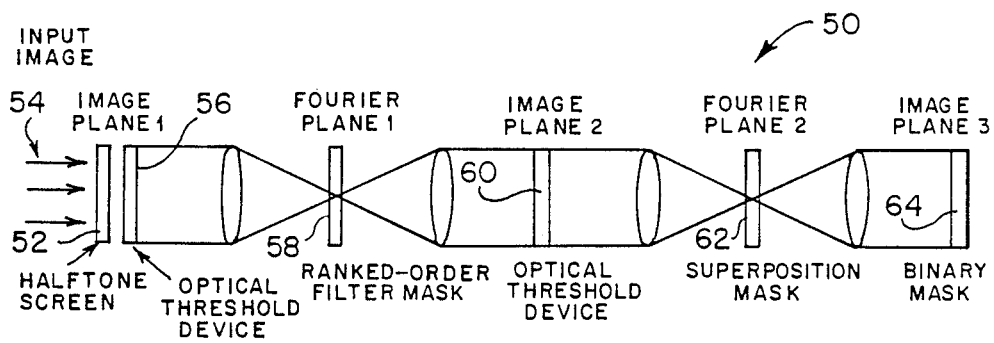
FIG. 3 is a schematic representation of a totally optical embodiment of the present invention.

Disclosed in FIG. 3 is a fully optical system 50 of ranked-order filtering. The electronic thresholding steps have been replaced by devices that act as optical thresholds. Although such devices do not currently exist for use at the low light levels prevalent in optical processing, their development is an active area of research. To obtain the spatially-varying threshold required to generate the binary threshold components, a halftone screen 52 is placed between the incoming image 54 and the first optical threshold device 56. The image 54 should be slowly varying with respect to the periodic structure of the halftone screen 52 because any one image pixel must be mapped to a number of binary threshold pixels. The ranked-order filter mask 58 is positioned in the first Fourier plane. At the output of the first state, a second optical threshold device 60 is used to obtain the filtered binary threshold components. The second Fourier plane contains a superposition filter mask 62. In the output plane, a binary mask 64 is used to select the appropriate ranked-order filtered values. For example, with a 16-level input image, the binary mask would transmit only every 4th pixel in each direction. This image could then be detected by a camera or serve as input for further optical processing.

Thus, while the present invention has been described with respect to exemplary embodiments thereof, it will be understood by those of ordinary skill in the art that variations and modifications may be effected within the scope and spirit of the invention.

We claim:

1. A method for performing two-dimensional ranked-order filtering of an image comprising the steps of:
   electronically screening the image;
   generating binary threshold images of the electronically screened image;
   writing the generated binary threshold images on a first spatial light modulator;
   projecting the generated binary threshold images from the first light modulator;
   filtering by ranked-order the projected binary threshold images to form multiplexed threshold images;
   imaging a composite image of the filtered multiplexed threshold images;
   electronically screening the composite image with a constant threshold;
   writing the screened composite image onto a second spatial light modulator;
   projecting the screened composite image from the second spatial light modulator;

filtering by superposition the projected composite image; and imaging the superposition filtered composite image.

2. A method for performing ranked-order filtering as claimed in claim 1 wherein the first and second spatial light modulator are a unitary spatial light modulator having a filter plane.

3. A method for performing ranked-order filtering as claimed in claim 2 wherein said filtering by ranked-order includes the steps of encoding a Fourier transform of a ranked-order filter window on a computer-generated hologram and disposing the computer generated hologram at the filter plane.

4. A method for performing ranked-order filtering as claimed in claim 3 wherein said filtering by superposition includes the steps of encoding the computer generated hologram with a Fourier transform of a superposition filter window.

5. A method for performing ranked-order filtering as claimed in claim 1 wherein the screening of the composite image step includes the step of initially calibrating the constant threshold in order to obtain one of median filtering, minimum filtering and maximum filtering.

6. An apparatus for performing two-dimensional ranked-order filtering of an image comprising:

a screening means for electronically screening the image and for generating binary threshold images thereof;

a first spatial light modulator and a second spatial light modulator;

a writing means for writing the binary threshold images on said light modulator;

a projecting means for projecting the generated binary threshold images from said first light modulator;

a filtering means for ranked-order filtering of the projected binary threshold images to form multiplexed threshold images;

an imaging means for imaging a composite image of the multiplexed threshold images;

a screening means for electronically screening the composite image with a constant threshold;

a writing means for writing the screened composite image onto said second spatial light modulator;

a projecting means for projecting the screened composite image from said second light modulator;

a filtering means for filtering by superposition the projected composite image; and an imaging means for imaging the superposition filtered composite image.

7. An apparatus for ranked-order filtering as claimed in claim 6 wherein said first light modulator and said second light modulator are a unitary light modulator.

8. An apparatus for ranked-order filtering as claimed in claim 7 wherein said ranked-order filtering means is a computer-generated hologram encoded with a Fourier transform of a ranked-order filter window.

9. An apparatus for ranked-order filtering as claimed in claim 8 wherein said superposition filtering means is a Fourier transform of a superposition filter window encoded on said computer-generated hologram.

10. An apparatus for ranked-order filtering as claimed in claim 9 wherein said unitary projecting means includes a laser beam and a rotating diffuser through which said laser beam is passed.

11. An apparatus for ranked-order filtering as claimed in claim 6 and further including a threshold setting means for initially setting the constant threshold of said screening means for the composite image.

12. An optical system for performing ranked-order filtering of an image comprising:

a first optical thresholding means for generating binary threshold components of the image at a first Fourier plane;

a ranked order filtering means located at the Fourier plane for ranked-order optical filtering of the binary threshold components;

a second optical thresholding means for generating filtered binary threshold components at a second Fourier plane;

a superposition filtering means located at the second Fourier plane for superposition optical filtering of the filtered binary threshold components; and an optical binary means for selecting predetermined ranked-order filter values of the superposition filtered binary threshold components.

* * * * *